Figure 1:
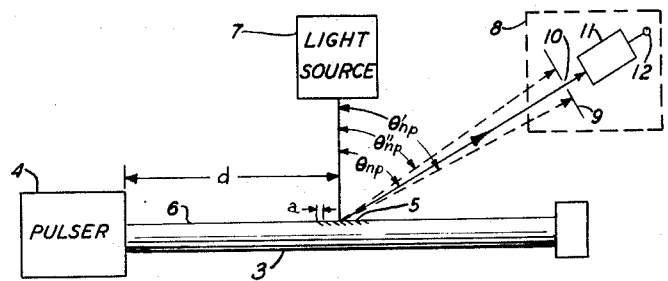

May 10, 1960     T. R. LONG     2,936,381
LIGHT BEAM APPARATUS
Filed April 9, 1958

INVENTOR
T. R. LONG
BY
Kenneth B. Hamlin
ATTORNEY

United States Patent Office 2,936,381
Patented May 10, 1960

2,936,381
LIGHT BEAM APPARATUS

Thomas R. Long, Bridgewater Township, Somerset County, N.J., assignor to Bell Telephone Laboratories, Incorporated, New York, N.Y., a corporation of New York Application April 9, 1958, Serial No. 727,440
8 Claims. (Cl. 250—231)

This invention relates to light beam apparatus and more particularly to such apparatus employed for signal transfer and distribution.

The handling and storage of information in data processing systems frequently necessitates that intelligence available in one form at a given point in a system be transferred to another point, at which point such information may be more conveniently utilized in a form different from that in which it was originally available. Among the more commonly occurring instances in which such signal translation and distribution problems arise is where a fixed or variable delay interval is to be inserted in an electrical signal transmission path and where use is accordingly made of the low velocity of propagation associated with acoustic or ultrasonic impulses. Heretofore, ultrasonic delay lines have been extensively utilized to achieve in a relatively compact mechanical signal transmission member the delay equivalent to the transmission of the signal over an electrical path of considerably greater length. The presence of the acoustical impulse in the mechanical signal transmission member has been priorly determined by transducer apparatus employing piezoelectric or electromagnetic principles to convert to corresponding electrical signals. One such detection apparatus employing magnetic principles is shown in the copending application of the present inventor bearing Serial Number 724,389, filed March 27, 1958. These methods for detecting sonic impulses have, however, entailed the tapping of some portion of the strain impulse energy of the signal and yield electrical output signals of magnitude normally requiring subsequent amplification to be rendered adaptable further for transmission or storage. The selective distribution of such conventionally obtained electrical output signals among a plurality of output circuits is readily achieved by any of the many switching devices well known in the art. Where, however, one or more of these output circuits involve electro-optic or photosensitive apparatus, it is desirable to eliminate the need for the intermediate conversion of signal form and to achieve the selective distribution of the signal among these output circuits more directly by optical detection and optical distribution methods.

Accordingly, it is an object of the present invention to provide an improved signal translation device.

It is another object of the present invention to provide an improved signal distribution apparatus.

It is another object of the present invention to provide an opto-mechanical signal detection device.

The foregoing and other objects are achieved in accordance with the principles of the present invention wherein a reflective diffraction grating is distorted by applying thereto a strain impulse to produce a corresponding distortion in the pattern of light reflected therefrom. In one illustrative embodiment, the presence of such strain impulse is determined by normally directing a monochromatic light beam upon a replica grating affixed to an elastic, acoustic impulse transmission member and by detecting the displacement of the $n$th order reflection produced as the strain impulse passes through the grating.

The principles applicable to diffraction gratings determine that a reflected light pattern of alternate light and dark bands results from illuminating the grating with a light source producing a line spectra and that the $n$th order light band will be produced at an angle $\theta_{np}$ with the direction of incident light beam given by the grating equation:

$$a \sin \theta_{np} = n\lambda_p$$

where $a$ is the spacing between the successive grating discontinuities, $\lambda_p$ is the wavelength of the incident light and an $n$ is an integer not exceeding $a/\lambda_p$. The relationship between the angular deflection of the $n$th order reflection and the magnitude of the strain impulse as obtained from the grating equation is given by the formula $$d\theta_{np} = -\left(\frac{da}{a}\right) \tan \theta_{np}$$

where the quantity $$\frac{da}{a}$$

represents the strain deformation of the grating. The negative sign indicates that a strain impulse which increases the grating spacing $a$ will produce a decrease in the angle $\theta_{np}$.

In another illustrative embodiment in accordance with the above principles, a signal may be selectively distributed among a plurality of receiving locations as directed by an order signal which determines the degree of light band deflection effected upon the application of the strain impulse to the grating. In one aspect of this embodiment the degree of light band deflection is determined by the order signal controlling the magnitude of the strain impulse applied to the grating while in another aspect the order signal may control the wavelength of light incident upon the grating during the application of the strain impulse.

It is, accordingly, a feature of the present invention that ultrasonic impulses in a transmission member be detected by diffracting a light beam focused thereon.

It is another feature of the present invention that intelligence be distributed among a plurality of signal channels by a selectively diffracted light beam.

Another feature of the present invention is that a signal delay line comprise an ultrasonic transmission member having a reflective diffraction grating for detecting signals therein.

It is a still further feature of the present invention that a signal translation apparatus comprise a diffraction grating operated to produce a light pattern representative of the signal information.

Figure 2:
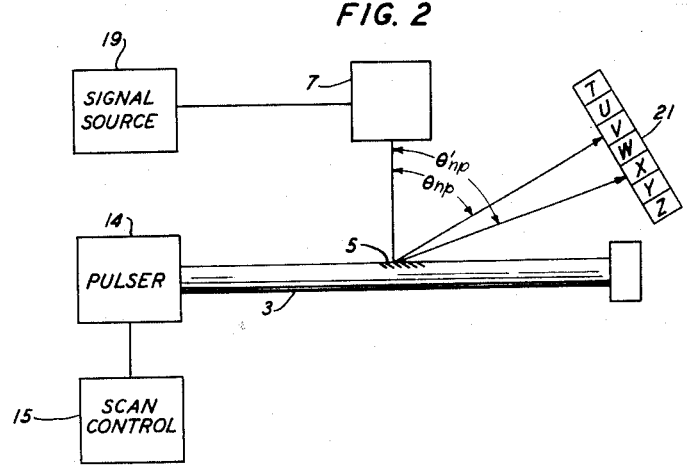

The foregoing and other objects and features of the present invention may be more readily understood from the following detailed description and the accompanying drawing in which:

Fig. 1 schematically depicts one specific illustrative embodiment of an optical impulse-detection apparatus in accordance with the principles of this invention;

Fig. 2 schematically depicts another illustrative embodiment of an optical impulse detection and signal distribution system.

Figure 3:
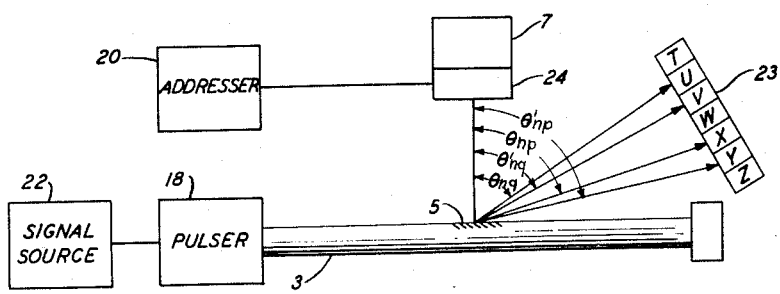

Fig. 3 schematically depicts a further illustrative embodiment of an optical impulse detection and signal distribution system in accordance with the principles of this invention.

In Fig. 1 there is shown an impulse detection apparatus comprising an ultrasonic impulse transmission member 3, such as a quartz or metal rod bar or tube connected at its left end to an ultrasonic impulse generator 4 and having located on its surface at a distance $d$ from its left end a reflective diffraction grating 5 having lines spaced apart by a distance or grating space $a$. Grating 5 advantageously may comprise a group of closely spaced lines inscribed upon a flat specular surface 6 of member 3 or, equally advantageously, a less expensive replica grating of collodion or other commonly used material may be affixed to the surface of member 3. Details of diffraction grating construction are fully described in textbooks on the subject. A light source 7 which produces a line spectra of wavelength $\lambda_p$ is focused at normal incidence upon grating 5, and in accordance with the above-noted grating equation $$a \sin \theta_{np} = n\lambda_p$$

there is produced at angle $\theta_{np}$ the $n$th order reflection of $\lambda_p$. For purposes of clarity only one such reflection is shown, it being understood that reflections of different order also satisfying the grating equation are also produced and occur at angles respectively corresponding to the order of such reflection. The $n$th order reflection is cast upon utilization apparatus 8 which advantageously may comprise an opaque screen 9 having a slit 10 disposed so as to allow the $n$th order reflection to fall upon photocell 11, which photocell produces an electrical signal at terminal 12 indicative of the presence of the $n$th order reflection. The energization of pulser 4 produces a strain impulse which travels down member 3 and upon reaching the distance $d$ effects a perturbation in grating space $a$, which space is shown greatly exaggerated in the drawing. Since the angle $\theta_{np}$ is determined by the space $a$, the angle at which the $n$th order reflection of $\lambda_p$ is cast will accordingly undergo a perturbation. The magnitude of the angular deviation from $\theta_{np}$ is proportioned to the magnitude of the strain impulse applied to member 3 by pulser 4, and the direction of the deviation is determined by whether the strain impulse is a compression or rarifaction, i.e. whether grating spacing $a$ is momentarily decreased or increased. The deflected angles of reflection shown as $\theta'_{np}$ and $\theta''_{np}$ correspond respectively to a perturbation effecting a decrease and a perturbation effecting an increase in grating space $a$. In this manner the arrival of the strain impulse causes the $n$th order reflected light beam to move so as to be shielded from photocell 11 by opaque screen 9 bringing about the de-actuation of photocell 11 indicated by a change in potential of terminal 12. The optical apparatus of Fig. 1 is thus seen to function as an output transducer for an ultrasonic delay line. By providing for movement of light source 7 and utilization apparatus 8 relative to member 3 so as to increase or decrease distance $d$, a variable delay line is readily achieved.

In Fig. 2 there is depicted a signal distribution device utilizing to particular advantage the above-noted relationship:

$$d\theta_{np} = -\left(\frac{da}{a}\right) \tan \theta_{np}$$

which states that the deflection in the angle of reflection is proportioned to the strain deformation of the grating. The apparatus of Fig. 2 is similar to that described above in connection with Fig. 1 comprising in addition a signal source 19 for intensity modulating light source 7, a pulser 14 operable to apply to member 3 strain impulses of magnitude determined by scan control 15, and a utilization apparatus 21 comprising address areas T through Z. The address areas of utilization apparatus 21 may each comprise a photosensitive cell and aperture as was specified for apparatus 8 of Fig. 1 or, alternatively, the address areas may comprise portions of a photosensitive matrix or mosaic. In operation the light beam reflected from grating 5 in the absence of a strain impulse applied to member 3 may be positioned to fall upon any of the address areas of utilization apparatus 21 such as area V. The scan control 15 may be then set to control pulser 14 to apply to a strain impulse to member 3 of sufficient magnitude to cause the reflected beam to traverse address area W, momentarily come to rest upon address area X, and return to address area V, upon the cessation of the strain impulse. The signal source 19, controlling light source 7, may be synchronized with the operation of pulser 14 and scan control 15 so that the light beam from source 7 may be selectively extinguished during the traversal of any of the areas of utilization apparatus 21 such as the intermediate address area W. In this manner the signals presented by signal source 19 may be selectively distributed among any of the address areas of utilization apparatus 21.

For purpose of clarity the reflected light beam has been shown as deflected by a compressional strain crest in member 3 which decreases the grating spacing. However, it is to be understood that a rarefactional strain crest in member 3 will cause an opposite deflection of the reflected light beam, as, for example, is shown by angle $\theta''_{np}$ in Fig. 1.

In the embodiment of Fig. 3, a signal distribution device is shown possessing an additional degree of controllability over that shown in Fig. 2, in that either or both the magnitude of the strain impulse applied to member 3 and the wavelength of the light incident upon member 3 may be selectively adjusted by signal source 22 and addresser 20, respectively. In this manner of operation, that aspect of the grating equation $$a \sin \theta_{np} = n\lambda_p$$

which shows that the reflection angle $\theta$ is dependent upon the wavelength of incident light is used to particular advantage. In Fig. 3 incident light of wavelength $\lambda_q$ will, in the absence of an applied strain impulse, cast a reflection at the angle $\theta_{nq}$, and upon the operation of signal source 22 this reflection will be deflected to angle $\theta'_{nq}$. Similarly, reflected beams at angles of reflection $\theta_{np}$ and $\theta'_{np}$ are shown corresponding to wavelength $\lambda_p$ of incident light, which wavelength is provided by light source 7 upon the operation of addresser 20 while during the non-operation of addresser 20 light source 7 provides light of wavelength $\lambda_q$. The signal from addresser 20 may modulate the wavelength of light produced by source 7 in any number of well-known methods. For example, a colored transparent filter 24 may be inserted in the path of the light beam generated in source 7 or, equally advantageously, the potential applied to a similarly located dichroic crystal may be altered by the signal from addresser 20.

While in Figs. 1 through 3 only the $n$th order reflected light beams have been shown, it is apparent that the other orders of reflection may also be advantageously utilized depending upon the mode of operation desired and the particular characteristics specified for utilization apparatus 21 and 23, respectively. For example, address area W of utilization apparatus 23 may advantageously use the reflection, not shown in the drawing, of order $(n+1)$ produced by light of wavelength $\lambda_q$ during the application of a compressional strain impulse crest to member 3, and address area W may also use the reflection, also not shown in the drawing, produced by light of wavelength $\lambda_p$ during the application of a rarefaction strain impulse crest to member 3.

Representative values of the physical parameters interrelated by the grating equation may be advantageously selected in accordance with the requirements of any given optical detection or distribution system, of which the following values are illustrative:

| | |
|---|---|
| Ultrasonic transmission member 3 | 3' length of 1/8" square cross sec-t'on nickel rod. |
| Grating space ($a$) | $1.25 \times 10^{-4}$ cm. |
| Wavelength ($\lambda_p$) | 5000 A. |
| Wavelength ($\lambda_q$) | 7000 A. |
| Strain ($\frac{da}{a}$) | $10^{-4}$ |
| First order reflection ($\theta_{np}$) | 23.6°. |
| Angular deviation ($d\theta_{np}$) | $0.437 \times 10^{-4}$ radians. |
| Second order reflection ($\theta_{np}$) | 53.2°. |
| Angular deviation ($d\theta_{np}$) | $1.37 \times 10^{-4}$ radians. |
| First order reflection ($\theta_{nq}$) | 34.1°. |
| Angular deviation ($d\theta_{nq}$) | $0.56 \times 10^{-4}$ radians. |

By utilizing a conventional magnetostrictive transducer in pulser 14 of Fig. 2, adjustment of the current therein by scan control 15 will produce, in accordance with the well-known properties of such transducers, a range in magnitude of strain impulse applied to member 3 of from $10^{-5}$ to $10^{-4}$. A similar ten to one range in the magnitude of the angular deflection $d\theta_{np}$ and $d\theta_{nq}$ is accordingly effected. Analogous results may be obtained using quartz rods and the equally well-known transducer techniques appropriate thereto. When such a magnetostrictive ultrasonic impulse generator is coupled to an ultrasonic transmission member 3 constructed of nickel, the maximum strain crest is contained in the compressional mode resulting in angular deviations $d\theta_{np}$ and $d\theta_{nq}$ which increase the angles of $n$th order reflection $\theta_{np}$ and $\theta_{nq}$, respectively, whereas the maximum strain crest in a 45 percent nickel iron alloy ultrasonic transmission member is contained in the rarefactional mode resulting in a decrease in each of the angles $\theta_{np}$ and $\theta_{nq}$.

It is to be understood that the above-described arrangements are illustrative of the application of the principles of the invention. Numerous other arrangements may be devised by those skilled in the art without departing from the spirit and scope of the invention.

What is claimed is:

1. An impulse detection device comprising an ultrasonic impulse transmission member, means for projecting a beam of light on said member, means for applying a strain impulse to said member, and diffraction means having a predetermined grating spacing associated with said member for selectively deflecting said light beam as said strain impulse distorts said grating spacing.

2. An impulse detection device in accordance with claim 1 wherein said diffraction means comprises a specular surface of said member having a pattern of closely-spaced grooves thereon.

3. An impulse detection device in accordance with claim 1 wherein said diffraction means comprises a reflective replica grating affixed to said member.

4. In a signal delay apparatus, the combination comprising a mechanical impulse transmission member, means for applying a strain impulse at one end of said member strain deformable, diffraction grating means located on said member at a predetermined distance from said one end, means for projecting a light beam on said grating means, and output means responsive to the change in diffraction pattern produced by said grating means as said strain impulse passes through said grating means.

5. The combination defined in claim 4 wherein said output means comprises photosensitive cell means and means in juxtaposition therewith for selectively shielding said cell means from said grating means.

6. In a signal translation and distribution system the combination comprising an elastic surface member, means for applying strain impulses to said member, reflective diffraction grating means positioned on said surface, light source means for selectively projecting a light beam on said grating means, a source of address order signals, means responsive to said address order signals for controlling said light source means, and output means responsive to the light pattern reflected from said grating means as said impulses distort said elastic surface member.

7. The combination according to claim 6 wherein said means for controlling said light source means comprises filter means for selectively modulating the wavelength of said light beam.

8. The combination defined in claim 7 in combination with means connected to said means for applying strain impulses to said member for controlling the amplitude of said strain impulses.

References Cited in the file of this patent

UNITED STATES PATENTS

| | | |
|---|---|---|
| 2,453,533 | Norton | Nov. 9, 1948 |
| 2,540,105 | Dunbar et al. | Feb. 6, 1951 |
| 2,586,540 | Holden | Feb. 19, 1952 |
| 2,625,850 | Stanton | Jan. 20, 1953 |
| 2,783,455 | Hindall | Feb. 26, 1957 |
| 2,877,431 | McSkimin | Mar. 10, 1959 |